(12) United States Patent
Elvestad et al.

(10) Patent No.: US 9,695,949 B2
(45) Date of Patent: Jul. 4, 2017

(54) METHOD AND SYSTEM OF A VALVE

(71) Applicant: PGS Geophysical AS, Oslo (NO)

(72) Inventors: Karl Petter Elvestad, Troegstad (NO); Michael Malling, Oslo (NO)

(73) Assignee: PGS Geophysical AS, Oslo (NO)

( * ) Notice: Subject to any disclaimer, the term of this patent is extended or adjusted under 35 U.S.C. 154(b) by 133 days.

(21) Appl. No.: 14/692,913

(22) Filed: Apr. 22, 2015

(65) Prior Publication Data

US 2016/0061336 A1 Mar. 3, 2016

Related U.S. Application Data

(60) Provisional application No. 62/043,815, filed on Aug. 29, 2014.

(51) Int. Cl.
*F16K 31/52* (2006.01)
*F16K 3/26* (2006.01)
*F16K 31/44* (2006.01)
*F16K 3/18* (2006.01)

(52) U.S. Cl.
CPC .............. *F16K 3/267* (2013.01); *F16K 3/184* (2013.01); *F16K 31/445* (2013.01); *F16K 31/523* (2013.01); *Y10T 137/88094* (2015.04)

(58) Field of Classification Search
CPC G01V 1/133; G01V 1/137; Y10T 137/88078; Y10T 137/88086; Y10T 137/88094; Y10T 137/6253; Y10T 137/6362; Y10T 137/7465; Y10T 137/7472; Y10T 137/7478; Y10T 137/7481; F16K 3/267; F16K 31/523; F16K 31/524; F16K 3/0254; F16K 3/184; F16K 3/205; F16K 31/44; F16K 31/445; E21B 34/12
USPC ...... 137/330, 331, 333, 616.5; 251/215, 229, 251/251, 252, 341, 346, 347
See application file for complete search history.

(56) References Cited

U.S. PATENT DOCUMENTS

| | | | | |
|---|---|---|---|---|
| 759,246 | A | * | 5/1904 | Delany ................... F16K 31/58 137/616.5 |
| 1,085,839 | A | * | 2/1914 | Acton ................ A46B 11/0013 251/340 |
| 2,255,774 | A | * | 9/1941 | Huffman ........... F16K 31/52408 137/616.5 |
| 3,083,944 | A | * | 4/1963 | Doeden .................. B23B 45/04 173/169 |
| 3,106,722 | A | * | 10/1963 | Logan ....................... E03C 1/02 137/616.5 |
| 3,198,210 | A | * | 8/1965 | Lewis ..................... F16K 31/58 137/616.5 |
| 3,386,701 | A | * | 6/1968 | Potts ....................... E21B 34/12 166/330 |
| 3,774,632 | A | * | 11/1973 | Mrugala ................. F16K 31/52 137/315.27 |

(Continued)

*Primary Examiner* — Matthew W Jellett

(57) ABSTRACT

Valves. At least some of the example valves include: a valve body; a valve housing; and a piston that defines a proximal end and a distal end, the piston disposed in a piston bore of the valve housing. The valve defines a closed orientation by a first rotational orientation of the valve housing relative to the valve body, and the valve defines an open orientation by a second rotational orientation of the valve housing distinct from the first rotational orientation.

26 Claims, 8 Drawing Sheets

(56) References Cited

U.S. PATENT DOCUMENTS

| | | | |
|---|---|---|---|
| 3,980,101 A * | 9/1976 | Kurioka | F16K 31/52408 137/616.5 |
| 4,667,931 A * | 5/1987 | Egert | B05B 1/3013 251/263 |
| 6,220,530 B1 * | 4/2001 | Wu | B05B 1/304 239/525 |
| 7,562,860 B2 * | 7/2009 | Graf | B05B 1/005 251/209 |
| 8,353,383 B2 | 1/2013 | Carson | |
| 8,596,409 B2 | 12/2013 | Parkes et al. | |
| 2007/0263489 A1 | 11/2007 | Vaage | |
| 2011/0149681 A1 | 6/2011 | Hovland et al. | |
| 2014/0010044 A1 | 1/2014 | Hovland et al. | |

\* cited by examiner

METHOD AND SYSTEM OF A VALVE

CROSS-REFERENCE TO RELATED APPLICATIONS

This application claims the benefit of U.S. Provisional Application Ser. No. 62/043,815 filed Aug. 29, 2014, titled "Rotating Valves." The provisional application is incorporated by reference herein as if reproduced in full below.

BACKGROUND

Mechanical valves come in a wide variety of styles and designs. In many installations there are no significant physical constraints on the size of the valve, and no significant physical constraints on the size of the valve operator that may be used to open and close the valve. However, compact valve designs may be needed in certain situations, such as shipboard control valves.

BRIEF DESCRIPTION OF THE DRAWINGS

For a detailed description of exemplary embodiments, reference will now be made to the accompanying drawings, which are not necessarily to scale. In particular.

DEFINITIONS

Figure 1:
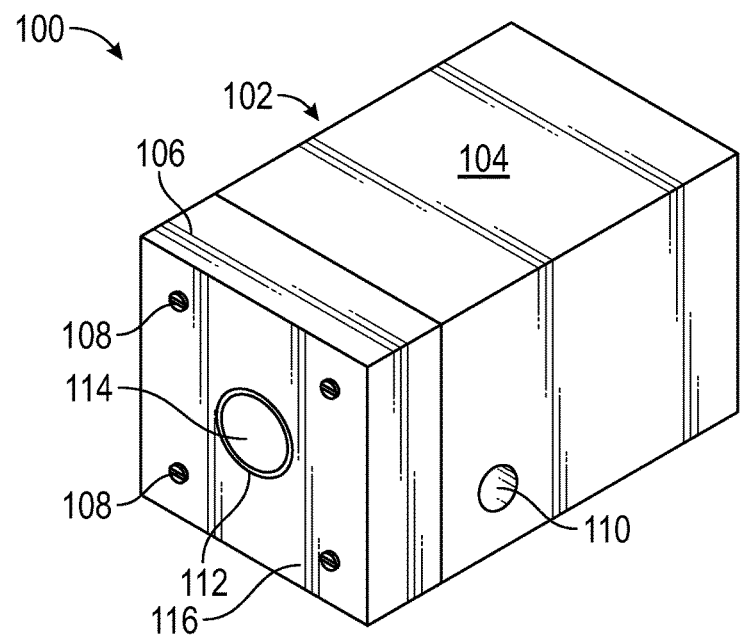
FIG. 1 shows a front perspective view of a valve in accordance with at least some embodiments.

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus shall be interpreted to mean "including, but not limited to . . . ." Also, the term "couple" or "couples" shall mean either an indirect or direct connection. Thus, if a first device couples to a second device, that connection may be through a direct connection or through an indirect connection via other devices and connections.

"Rotational orientation" with respect to the valve housing shall mean a rotational position of the valve housing about the central axis of the valve housing relative to another object (e.g., a valve body).

"Open orientation" of a valve assembly shall mean that, when the valve assembly is used, the valve assembly enables fluid flow through the valve assembly; however, defining an open orientation shall not require use to meet a claim limitation that requires an ability to achieve an open orientation.

"Closed orientation" of a valve assembly shall mean that, when a valve assembly is used, the valve assembly blocks fluid flow through the valve assembly; however, defining a closed orientation shall not require use to meet a claim limitation that requires an ability to achieve a closed orientation.

A valve assembly that defines a closed orientation and also defines an open orientation shall mean that a respective orientation is present at a recited mechanical relationship of components of the valve assembly, but shall not be read to require that both orientations must be simultaneously present in the valve assembly.

DETAILED DESCRIPTION

The following discussion is directed to various embodiments of the invention. Although one or more of these embodiments may be preferred, the embodiments disclosed should not be interpreted, or otherwise used, as limiting the scope of the disclosure or the claims. In addition, one skilled in the art will understand that the following description has broad application, and the discussion of any embodiment is meant only to be exemplary of that embodiment, and not intended to intimate that the scope of the disclosure or the claims, is limited to that embodiment.

The various example embodiments are directed to a valve assembly (hereafter just "valve"). More particularly, the various example embodiments are directed to a valve that has a piston that controls flow through the valve. The piston is translated from a closed orientation to an open orientation by rotation of a valve housing within which the piston is telescoped. Offset in the axial alignment of the central axis of the valve housing and the central axis of a receptacle into which the valve housing is telescoped results in translational movement of the piston during rotation. The specification first turns to a high level description of the valve.

FIG. 1 shows a front perspective view of a valve 100 in accordance with example systems. The example valve 100 has a valve body assembly 102 (hereafter just "valve body") made up of a main body member 104 and a lid or cap member 106. The cap member 106 may couple to the main body member 104 by any suitable connection mechanism, such as the fasteners 108 as shown in FIG. 1. The example valve body 102 of FIG. 1 is rectangular in shape, but any suitable shape that takes into account the internal components of the valve (discussed more below) may be used. The valve body 102 may be made of any suitable material based on the type of fluid to be controlled by the valve 100 and/or the pressure of the fluid. In some example systems, the valve body 102 is a metallic material.

The valve body 102 defines several apertures, two of which are visible in the view of FIG. 1. The example valve body 102 defines an inlet port 110 and an aperture 112 through which a circular stem member 114 of the valve housing is exposed. Inlet port 110 is disposed on a side of the main body member 104 proximate the cap member 106. The inlet port 110 fluidly couples to the internal components of the valve 100. Although in some example systems the inlet port 110 is the port into which fluids flow when the valve 100 is open, the example valve 100 is not necessarily directional and thus inlet port 110 could likewise be the port out which fluids flow when the valve is open. Placement of inlet port 110 on the main body member 104 is not required. In other example systems, the inlet port 110 could be disposed at any suitable location, such as on front face 116 of the cap member 106 (with the aperture 112), or one of the side faces of the cap member 106.

Aperture 112 is a circular aperture through the valve body 102, and in the example system the aperture 112 is disposed on the front face 116 of the cap member 106. A portion of the internal components of the valve—a circular stem member 114 of a valve housing—is telescoped within the aperture 112. For automatically operated valves (e.g., valves which have an electrical, mechanical, magnetic, hydraulic, pneumatic, or electromechanical valve operator), a device for imparting rotational motion to valve housing relative to the valve body 102 may couple to the circular stem member 114. For example, the shaft of an electric motor (e.g., AC induction motor, DC motor, stepper motor) may couple to the circular stem member 114 to enable selective opening and closing of the valve 100. In cases where the valve 100 is manually operated, a handle or knob may couple to the circular stem member to enable manually imparting rotational motion to the valve housing relative to the valve body 102.

Figure 2:
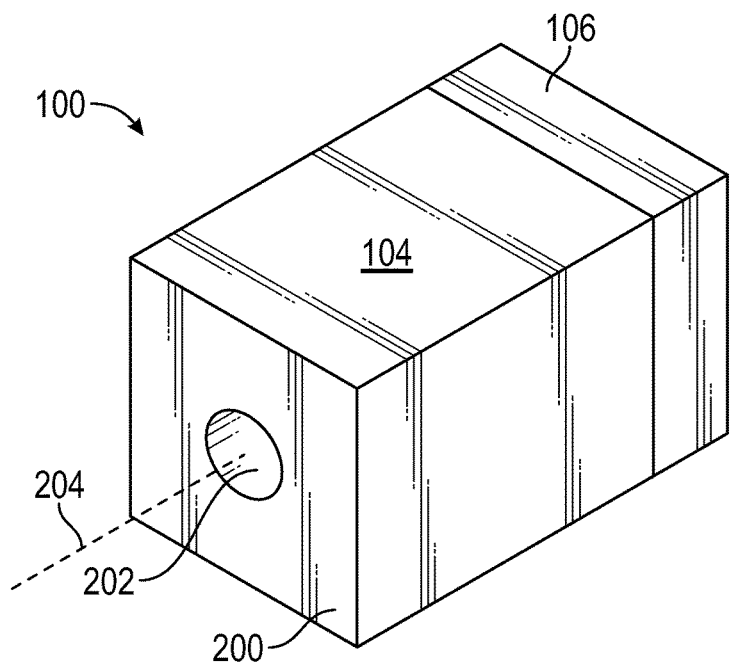
FIG. 2 shows a back perspective view of a valve in accordance with at least some embodiments.

FIG. 2 shows a back perspective view of the valve 100. Visible in FIG. 2 is the main body member 104 and the cap member 106. As shown in FIG. 2, the valve body 102 defines a back face 200 opposite the front face 116. Disposed on the back face 200 is an outlet port 202. The outlet port 202 fluidly couples to the internal components of the valve 100. Although in some example systems the outlet port 202 is the port out which fluids flow when the valve 100 is open, the example valve 100 is not necessarily directional and thus outlet port 202 could likewise be the port into which fluids flow when the valve is open. In the example system, the outlet port 202 is centered on the back face 200 and defines a central axis 204. As will be discussed more below, in example systems the central axis 204 of the outlet port 202 is coaxial with the valve housing (not visible in FIG. 2). However, placement of outlet port 202 on the back face 200 of main body member 104 is not required. It follows that the central axis 204 of the outlet port 202 need not be coaxial with other internal valve components. Thus, in other example systems the outlet port 202 could be disposed at any suitable location, such as on the back face 200 but offset relative to the center of the back face 200, or on one of the sides of the valve body 102.

Figure 3:
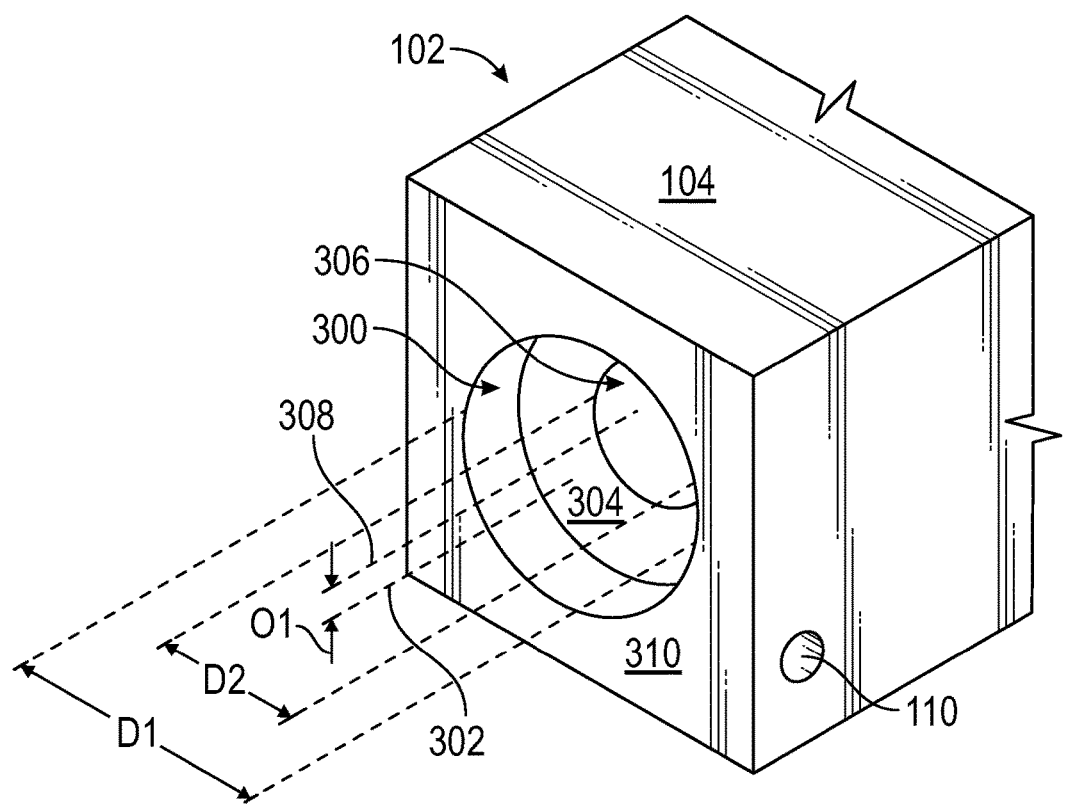
FIG. 3 shows a front perspective view of a valve body in accordance with at least some embodiments.

FIG. 3 shows a front perspective view of valve body 102 with the cap member 106 removed to show example internal features of the valve body 102. In particular, visible in FIG. 3 is a first receptacle or first counter bore 300. The first counter bore 300 defines a circular cross-section and a central axis 302. The first counter bore 300 defines an inside diameter D1. The first counter bore 300 defines a back wall 304, which back wall 304 defines a plane in the example system, which plane which may be perpendicular to the central axis 302 of the first counter bore 300. In one example valve, the inside diameter D1 is on the order of 3 to 4 centimeters (cm), but larger and smaller valves, and thus larger and smaller diameters, are contemplated. In example systems, the axial length of the first counter bore 300 (measured perpendicularly from a plane defined by face 310 and a plane defined by back wall 304) by may be about 25% percent of the diameter. Thus, in some cases the axial length of the first counter bore 300 is about 1 cm. Also visible in FIG. 3 is the inlet port 110 which is fluidly coupled to a volume defined by the first counter bore 300 (though the aperture of the inlet port 110 on through the internal diameter of the first counter bore 300 is not visible in FIG. 3).

It is noted that the nomenclature "first counter bore" shall not imply any particular method of creation of the first counter bore 300 in the valve body 102. In some cases the first counter bore 300 may be created by a boring operation, such as with a drill bit of appropriate size; however, other mechanisms for creation are also possible, such as a milling operation, casting an appropriate material over a mold that defines the first counter bore 300, and/or injection molding over a mold that defines the first counter bore 300.

Still referring to FIG. 3, the figure further shows a second receptacle or second counter bore 306 disposed within the first counter bore 300. The second counter bore 306 defines a circular cross-section and a central axis 308. The central axis 308 of the second counter bore 306 is parallel to the central axis 302 of the first counter bore, but is offset by a distance O1. For an example system where the inside diameter D1 of the first counter bore is 3 to 4 cm, the offset distance O1 may be on the order of 0.5 cm. The second counter bore 306 likewise defines an inside diameter D2. In one example valve, the inside diameter D2 is on the order of 1 to 2 cm, but larger and smaller valves, and thus larger and smaller diameters, are contemplated. In example systems, the axial length of the second counter bore 306 (measured from the plane of the back wall 304) may extend to the back face 200 (not shown in FIG. 3). However, other systems for fluidly coupling the second counter bore 306 to the outlet port 202 (not visible in FIG. 3) are contemplated and discussed more below. Also as discussed more below, a portion of a valve housing telescopes into the second counter bore 306, and likewise a portion of the valve housing telescopes into the first counter bore 300.

Here again it is noted that the nomenclature "second counter bore" shall not imply any particular method of creation of the second counter bore 306 in the valve body 102. In some cases the second counter bore 306 may be created by a boring operation, such as with a drill bit of appropriate size; however, other mechanisms for creation are also possible, such as a milling operations, casting, and/or injection molding. The specification now turns to an example valve housing and eccentric ring used in relation to the first and second counter bores 300 and 306.

Figure 4:
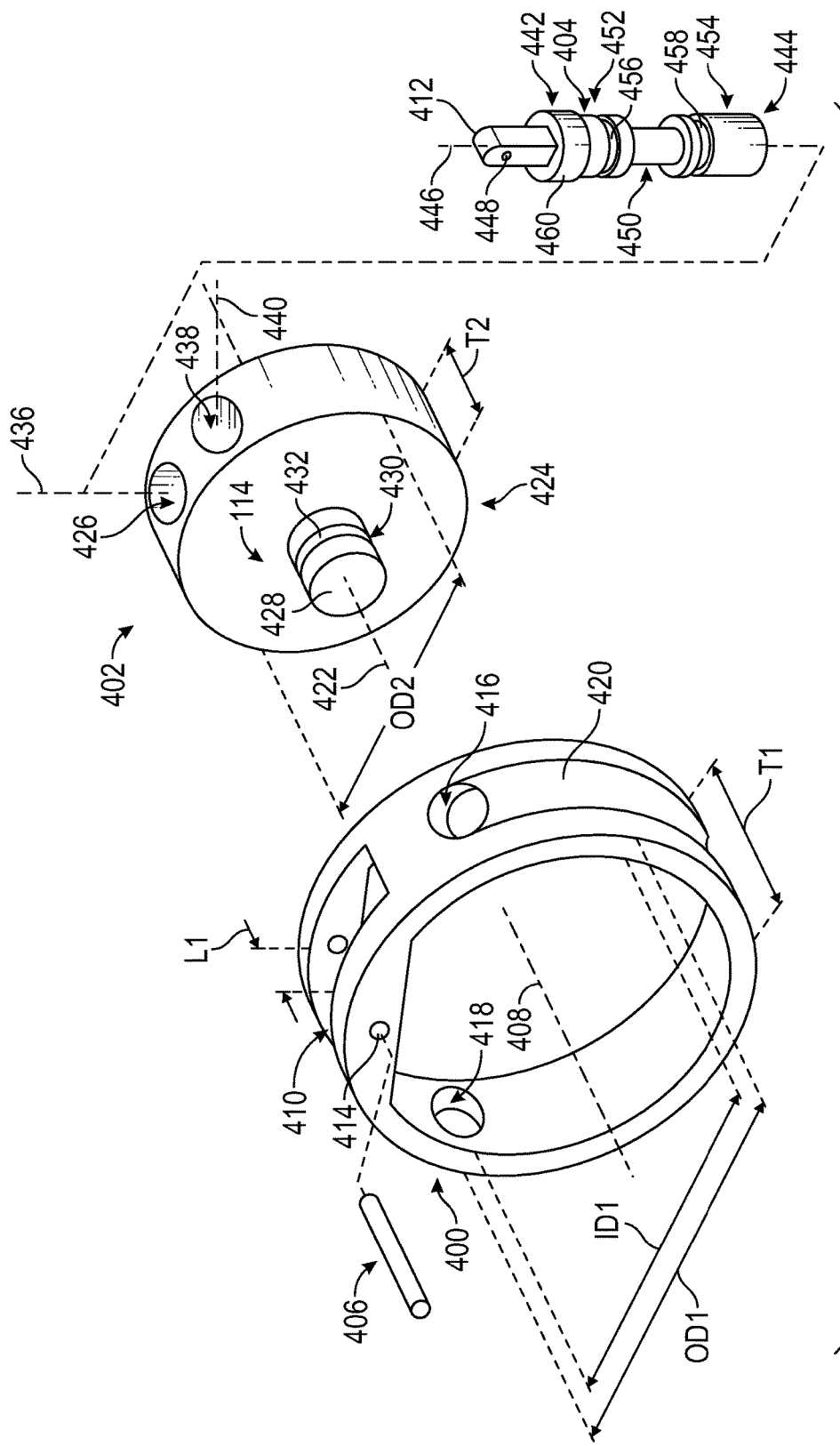
FIG. 4 shows an exploded perspective view of internal valve components in accordance with at least some embodiments.

FIG. 4 shows a perspective exploded view of internal components of the example valve 100. In particular, FIG. 4 shows an example eccentric ring 400, valve housing 402, piston 404, and pin 406. Each will be discussed in turn. Eccentric ring 400 is a ring that defines a central axis 408, an outside diameter OD1, an inside diameter ID1, and a radial thickness being about half the difference between the outside diameter OD1 and the inside diameter ID1. The eccentric ring 400 has an outside diameter OD1 slightly smaller than the inside diameter D1 of the first counter bore 300 (not shown in FIG. 4) such that the eccentric ring can be telescoped within the first counter bore 300 and can turn about the central axis 408 while disposed within the first counter bore 300. The eccentric ring 400 has an axial thickness T1 slightly smaller than the axial length of the first counter bore 300. The eccentric ring 400 is termed "eccentric" not because of a lack of circularity; rather, the eccentric ring 400 is so named because when installed within the valve body 102 the central axis 408 is offset from the central axis of the valve housing 402.

In order to couple to the piston 404 to the eccentric ring 400, the eccentric ring defines a slot 410. In the example systems the slot 410 may be about 1 to 2 cm in length (measured circumferentially), but longer and shorter slots are contemplated. The example slot 410 may have an axial length L1 on the order of about half length of the slot, but other sizes are contemplated. The slot is designed and constructed to accept the connector portion 412 of the piston 404 (discussed more below). The thickness of the eccentric ring 400 at the location of the slot 410 may increase for mechanical strength. Moreover, in some example systems the eccentric ring 400 may include a through bore 414 at the location of the slot 410. In an assembled valve 100, the pin 406 telescopes within the through bore 414 as well as through a corresponding through bore in the connector portion 412 of the piston, which pin 406 holds the piston 404 in position relative to the eccentric ring 400.

Still referring to FIG. 4, in some example systems the physical dimensions of the eccentric ring 400 relative to the first counter bore 300 may be such that the controlled fluid (e.g., water, hydraulic fluid, air, etc.) may move through the valve 100 by passing around eccentric ring 400. Thus, in such example systems no other features need be present on the outside diameter of the eccentric ring 400. In other cases, perhaps in order to reduce pressure drop across the valve 100, the eccentric ring 400 may comprise features which tend to channel the controlled fluid around and/or through the ring. The example eccentric ring 400 of the FIG. 4 utilizes such features. In particular, the example eccentric ring 400 has aperture 416 and aperture 418, the apertures 416 and 418 are disposed on opposite sides of the slot 410, and thus in an assembled valve 100 the apertures 416 and 418 are proximate to the proximal end of the piston 404. As will be shown in greater detail below, when the valve 100 is in an open orientation, at least one of the apertures 416 or 418 will at least partially align with the inlet port 110 (not shown in FIG. 4).

The example eccentric ring 400 further comprises optional annular groove 420 disposed on the outside diameter of the eccentric ring 400. In the example system, annular groove 420 intersects each of the apertures 416 and 418, thus spanning the circumferential distance around the eccentric ring 400, where the circumferential distance does not, in some systems, include the location of the slot 410. The cross-sectional shape of the annular groove 420 in FIG. 4 is semi-circular, but other cross-sectional shapes (e.g., rectangular, triangular) may be equivalently used. In valves using an eccentric ring 400 as shown in FIG. 4, and when the valve is less than fully open, the controlled fluid may flow through the inlet port 110, split and flow in opposite directions along the annular groove 420, and then each split stream enters the volume inside the eccentric ring 400 through the apertures 416 and 418.

The eccentric ring 400 may be made of any suitable material based on the type of fluid to be controlled by the valve 100. In some example systems, the eccentric ring 400 is a metallic material, but in other cases the eccentric ring 400 may be plastic.

Still referring to FIG. 4, attention now turns to the example valve housing 402. In particular, valve housing 402 defines a central axis 422. The central axis conceptually runs through the circular stem member 114, a piston receptacle member 424, and another circular stem member not visible in FIG. 4. In the assembled valve 100, the central axis 422 of the valve housing 402 is coaxial with the central axis 308 of the second counter bore 306 (not shown in FIG. 4), and the central axis 422 is parallel to and offset from the central axis 408 of the eccentric ring. Example circular stem member 114 has a circular cross section and defines an outer face 428 (which outer face 428 is visible in FIG. 1, but not explicitly referenced). Inasmuch as the valve housing 402 is exposed to the controlled fluid, to reduce escape of the controlled fluid a seal 430 resides on the circular stem member 114. In the example system of FIG. 4, the seal takes the form of an annular groove 432 on the outside diameter of the circular stem member 114, and an O-ring (not specifically shown). The O-ring is disposed in the annular groove in order to seal against an inside diameter of the aperture 112 of the cap member (not shown in FIG. 4). Other sealing systems may be equivalently used.

The valve housing 402 further comprises the piston receptacle member 424. The piston receptacle member 424 takes the form of the right circular cylinder having an outside diameter OD2 and an axial thickness T2. Because the valve housing 402 may telescope within the eccentric ring 400 in the assembled valve, the outside diameter OD2 is smaller than the inside diameter ID1 of the eccentric ring 400. More particularly, the outside diameter OD2 of the piston receptacle member 424 is no larger than the inside diameter ID1 of the eccentric ring 400 less the offset distance O1 (FIG. 3) between the central axis 302 of the first counter bore 300 and central axis 304 of the second counter bore 306. In valves where no eccentric ring is used, the outside diameter OD2 of the piston receptacle member 424 need only be smaller than the inside diameter of the first counter bore 300 less the offset distance O1 (FIG. 2).

The piston receptacle member 424 defines a piston bore 426 with a central axis 436, the piston bore through the outside diameter of the piston receptacle member 424. The central axis 436 of the piston bore 426 is perpendicular to, and passes through, the central axis 422 of the valve housing 402. In the example system, the piston bore 426 extends fully through the piston receptacle member 424. As will be discussed in greater detail below, the piston bore 426 intersects and is fluidly coupled to a flow passage that extends at least partially through the circular stem member on the back side of the valve housing 402 (not visible in FIG. 4) opposite the circular stem member 114. The piston receptacle member 424 further comprises at least one aperture 438. The example aperture 438 has a central axis 440 that intersects the central axis 436 of the piston bore 426, and in example cases intersects at a non-perpendicular angle. It follows that the aperture 438 defines a flow passageway to the piston bore 426. In the example valve 100, a second aperture is present (though not visible in FIG. 4) in the piston receptacle member 424, the second aperture disposed opposite the piston bore 426 from the aperture 438, and having similar properties to aperture 438 and central axis 440.

A few points about the valve housing before proceeding. While example valve housing 402 has piston receptacle member 424 that defines a right circular cylinder, the shape of the piston receptacle member 424 is not limited to a right circular cylinder. A portion of the piston receptacle member 424 will be in operational relationship to the eccentric ring 400 during portions of the use, and that portion may have a circular shape, but the remaining portions need not be circular so long as the shape is sized to rotate about the central axis 422 without striking or binding against other components (e.g., the internal diameter of the eccentric ring 400). Moreover, the valve housing 402 may be made of any suitable material based on the type of fluid to be controlled by the valve 100, design life of the valve, etc. In some example systems, the valve housing 402 is a metallic material, but in other cases valve housing may be plastic. Finally, in the example systems the valve housing 402 is a solid structure—the stem members and piston receptacle member may be constructed from a solid piece of material and/or formed to be an integral component. However, in other cases the individual members may be constructed separately and combined to form the valve housing. The specification now turns to the example piston 404.

Still referring to FIG. 4, the piston 404 defines a proximal end 442, a distal end 444, and a central axis 446. When assembled into the valve 100, the distal end 444 of the piston 404 telescopes into the piston bore 426, and thus the central axis 436 of the piston bore 426 and the central axis 446 of the piston are coaxial. The connector portion 412 is defined on the proximal end 442 of the piston 404. As discussed above, the connector portion 412 of the piston is designed and constructed to telescope within the slot 410 of the eccentric ring 400. In some cases, the connector portion 412 defines an aperture 448 through which pin 406 telescopes to hold the piston 404 in position relative to the eccentric ring 400.

The example piston 404 has an annular trough 450 medially disposed on the piston. On opposing sides of the annular trough 450 are seals 452 and 454. In the example system each seal 452 and 454 takes the form of an annular groove and an O-ring (not specifically shown). In particular, seal 452 may comprise an annular groove 456 on a first side of the annular trough 450, and likewise seal 454 comprises an annular groove 458 on a second side of the annular trough 450 opposite the first side. In an assembled valve 100, respective O-rings reside within the annular grooves 456 and 458, and the O-rings seal (at least part of the time) against an inside diameter of the piston bore. Other sealing systems may be equivalently used. The piston 404 may be made of any suitable material based on the type of fluid to be controlled by the valve 100, the expected differential pressures, and the design life of the valve. In some example systems, the piston 404 is a metallic material, but in other cases the piston may be plastic.

Figure 5:
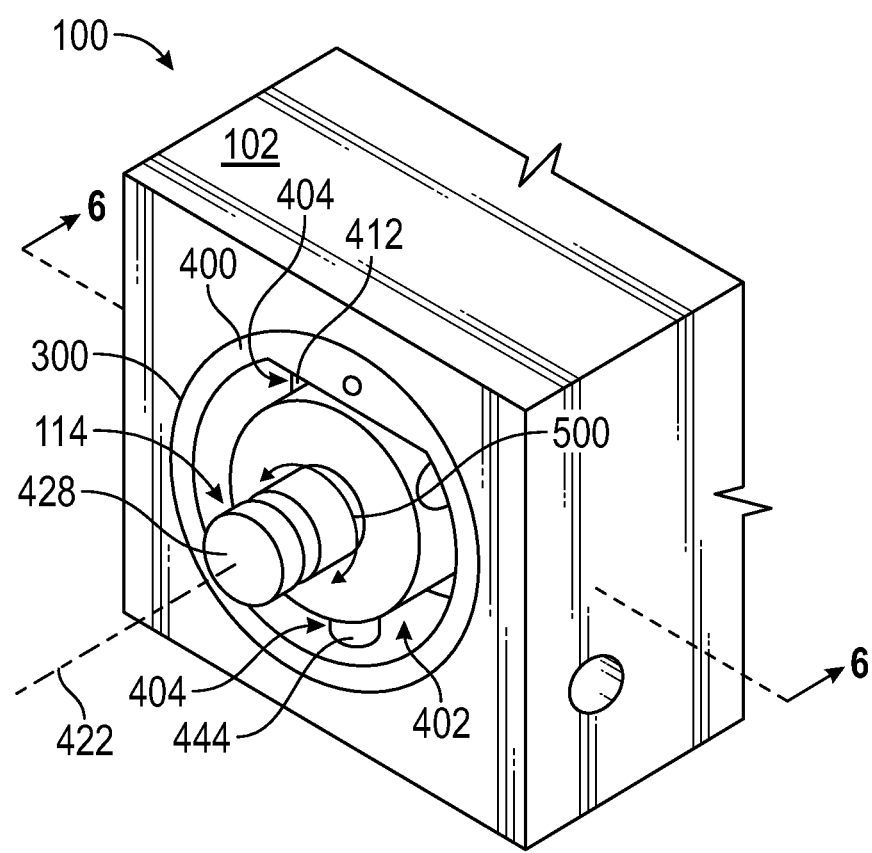
FIG. 5 shows a front perspective view of a partially assembled valve in accordance with at least some embodiments.

FIG. 5 shows a perspective view of valve body 102 with the cap member 106 removed, and with various internal valve components assembled into the valve 100. In particular, visible in FIG. 5 is the eccentric ring 400 telescoped within first counter bore 300. Also visible in FIG. 5 is the valve housing 402 (including the piston receptacle member 424) likewise telescoped within the first counter bore 300 (and though not visible in FIG. 5 a circular stem member telescoped within the second counter bore 306). The piston 404 is only partially visible. In particular, a portion of the connector portion 412 is visible on the upper portion of the eccentric ring 400, and the distal end 444 of the piston is visible in the lower space between the valve housing 402 and the eccentric ring 400. Also shown in FIG. 5 is the circular stem member 114, including the outer face 428.

As will be discussed in greater detail below, and notwithstanding the cap member 106 is removed for clarity, the valve 100 of FIG. 5 is shown in a closed orientation. In particular, the orientation shown is a first rotational orientation of the eccentric ring 400 relative to the valve body 102 (or, equivalently stated a first rotational orientation of the valve housing relative to the valve body). In the closed orientation the piston 404 is positioned such that the piston blocks flow through the flow passage (discussed more below) in the valve housing 402. The valve 100 is opened by turning the valve housing 402 about its central axis 422 to a second rotational orientation of the eccentric ring 400 relative to the valve body (or, equivalently stated a second rotational orientation of the valve housing relative to the valve body). For the valve 100 of the various embodiments, opening the valve may be accomplished by turning the valve housing 402 in either direction, as indicated by double-headed arrow 500. The specification now turns to a cross-sectional view taken along line 6-6 of FIG. 5.

Figure 6:
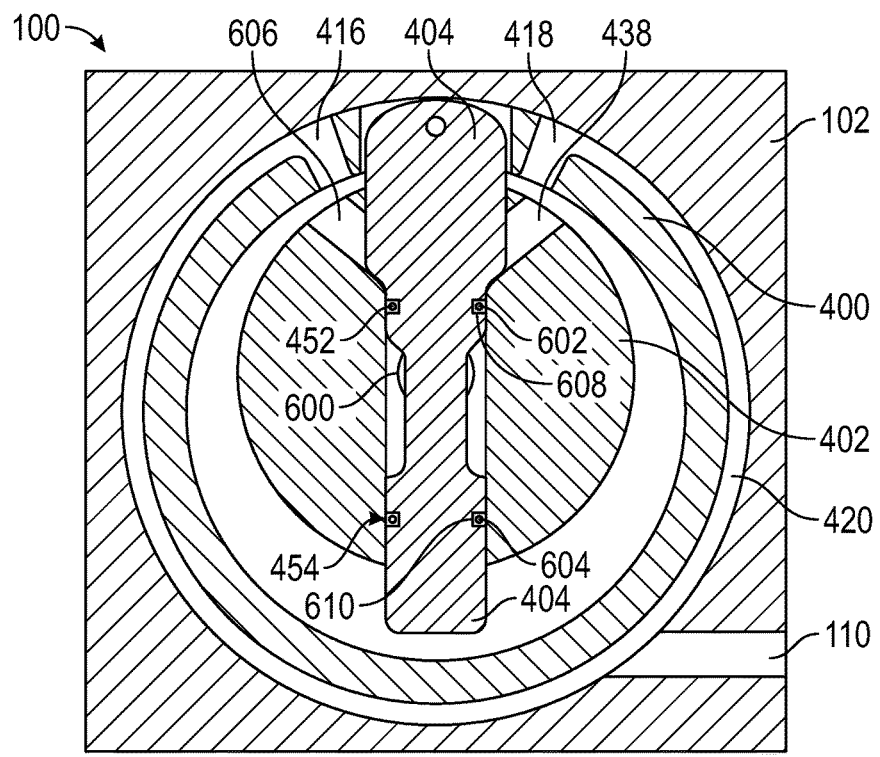
FIG. 6 shows a cross-sectional view (taken substantially along line 6-6 of FIG. 5) of a valve in a closed orientation in accordance with at least some embodiments.

FIG. 6 shows a cross-sectional view of the valve 100 taken substantially along line 6-6 of FIG. 5. In particular, visible in FIG. 6 are the valve body 102, the eccentric ring 400, the valve housing 402, the piston 404, and the inlet port 110. Partially visible is a flow passage 600 fluidly coupled to the outlet port 202 (not shown in FIG. 6). The orientation of the valve as shown in FIG. 6 is a closed orientation. The closed orientation of the valve 100 is defined by a rotational orientation of the valve housing 402 relative to the valve body 102 (or, alternatively, a rotational orientation of the eccentric ring 400 relative to the valve body 102). In the rotational orientation shown, the piston 404 is telescoped within the piston bore 426 such that both seals 452 and 454 are sealed against an internal diameter of the piston bore 426. Visible in FIG. 6 are the O-rings 602 and 604 in annular grooves 608 and 610, respectively. In the closed orientation as shown, the flow passage 600 is blocked to flow by the seals 452 and 454 of the piston 404.

Before proceeding to describe an open orientation of the valve, a few additional features are described. In particular, the cross-sectional view of FIG. 6 also shows the annular groove 420 in the eccentric ring 400. Also visible are the apertures 416 and 418 through the eccentric ring 400. Further visible is aperture 438 in the valve housing 402, as well as aperture 606 in the valve housing opposite the aperture 438 (and which aperture 606 was not visible in FIG. 4).

Figure 7:
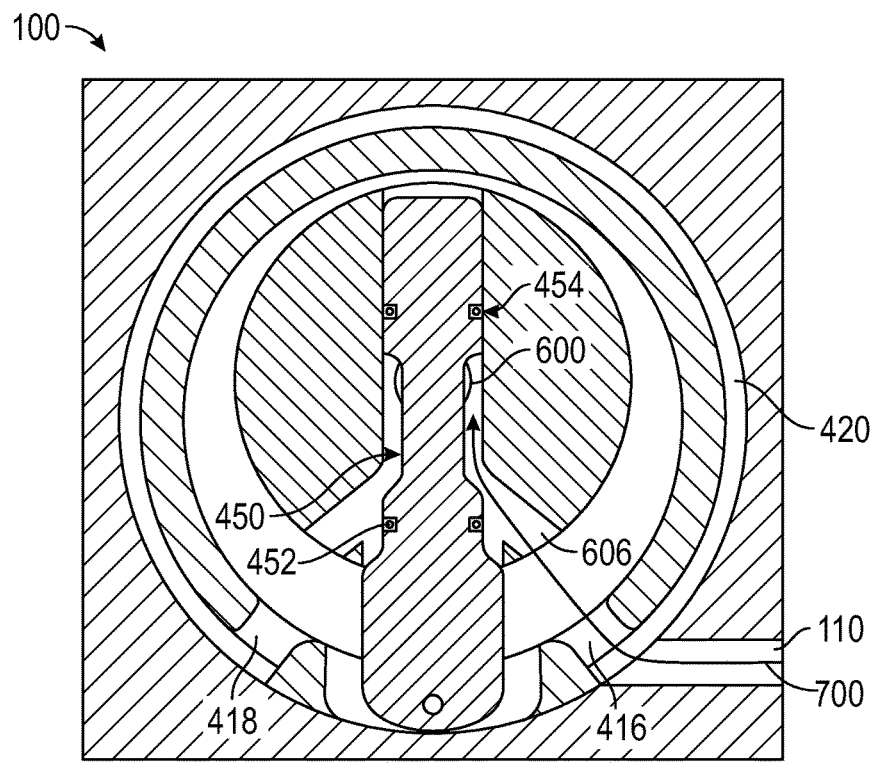
FIG. 7 shows a cross-sectional view of a valve in an open orientation in accordance with at least some embodiments.

FIG. 7 shows a cross-sectional view of the valve 100 similar to FIG. 6, but with the valve 100 shown in an open orientation. The open orientation of the valve 100 is defined by a rotational orientation of the valve housing 402 relative to the valve body 102 (or, alternatively, a rotational orientation of the eccentric ring 400 relative to the valve body 102). In some cases, the valve housing 402 is turned (by way of the circular stem member 114), and the force to turn the eccentric ring 400 is thus supplied by way of the piston 404. In the example system, the open orientation is about 180 degrees of rotation different than the closed orientation (shown in FIG. 6). In the rotational orientation shown, the piston 404 is telescoped within the piston bore 426, but only one seal 454 is sealed against an internal diameter of the piston bore 426. As discussed above, changing the rotational orientation of the valve housing 402 results in translation of the piston 404 within the piston bore 426. The seal 452 is withdrawn from an internal diameter of the piston bore 426 thus exposing the annular trough 450 to the internal volume of the valve. Thus, in the open orientation of FIG. 7 the controlled fluid may flow through the inlet port 110, through the aperture 416, through one or both of the apertures 438 and 606, into the annular trough 450, and into the flow passage 600 as illustrated by arrow 700. Thus, the inlet port 110 at least partially aligns with the aperture 416 through the eccentric ring 400 in an open orientation.

Before proceeding, it is noted that the valve 100 may be "open" to flow at rotational orientations between the fully closed orientation of FIG. 6 and the fully open orientation of FIG. 7. In such partially open configurations, the inlet port 110 and apertures 416 and/or 418 may not align; nevertheless, the controlled fluid may still flow through the valve by the fluid moving around the eccentric ring 400, and/or by the controlled fluid moving through the annular groove 420 and apertures 416 and 418 in the eccentric ring 400.

Figure 8:
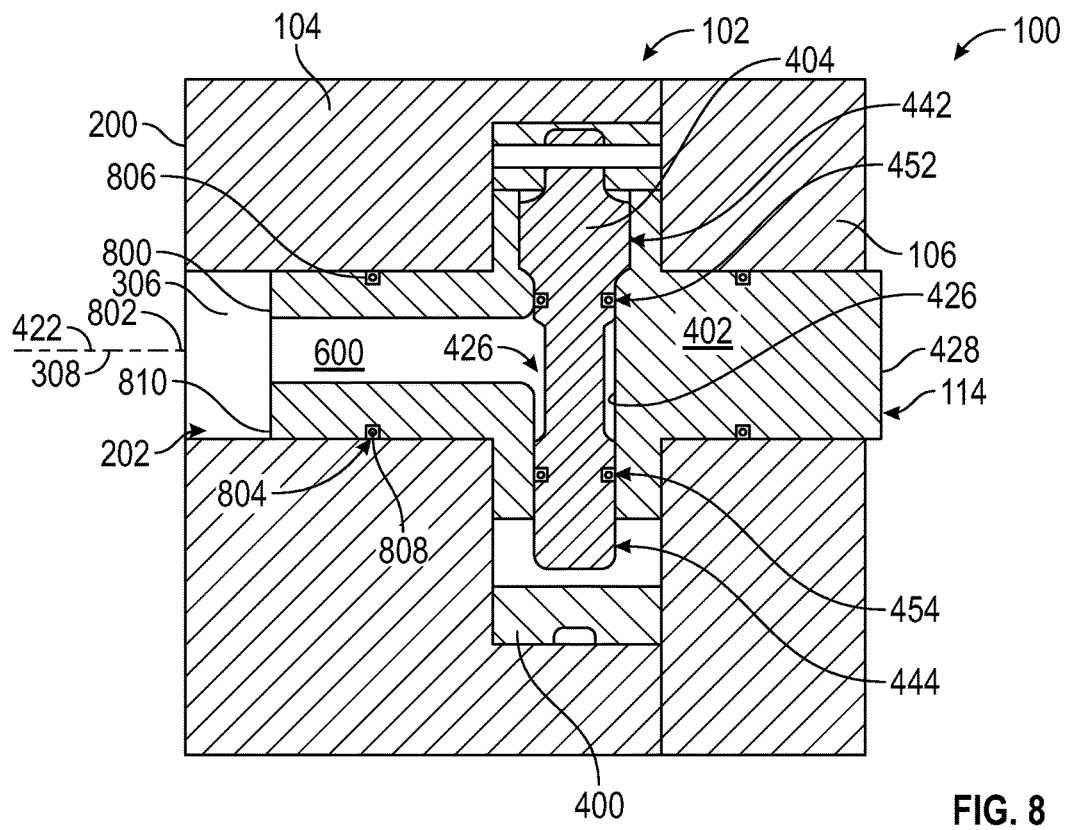
FIG. 8 shows a cross-sectional view (taken perpendicularly to the view of FIG. 6) of a valve in a closed orientation in accordance with at least some embodiments.

FIG. 8 shows a cross-sectional view of the valve 100 in a closed orientation, the cross-sectional view of FIG. 8 taken perpendicular to the cross-sectional view of FIG. 6. In particular, FIG. 8 shows the valve body 102 (comprising both the main body member 104 and the cap member 106). The outer face 428 of the circular stem member 114 is exposed through the cap member 106. Moreover, the outlet port 202 is likewise shown on the back face 200 of the valve body 102. Within the valve the valve housing 402 is shown, along with the eccentric ring 400 and the piston 404. Visible in FIG. 8 is the circular stem member 800 that defines a central axis 802. The outside diameter of the circular stem member 800 defines a circular cross section, and the circular stem member 800 is disposed on the opposite side of valve housing 402 from the circular stem member 114. Thus the central axis 802 of the circular stem member 800 is coaxial with the central axis 422 (FIG. 4) of the circular stem member 114. Moreover, and as shown, the circular stem member 800 telescopes within the second counter bore 306, and it follows that the central axis 802 of the circular stem member 800 is coaxial with the central axis 308 of the second counter bore 306. The circular stem member 800 defines a seal 804. In the example system the seal 804 is made of an annular groove 806 with an O-ring 808 disposed therein. The O-ring 808 seals against the internal diameter of the second counter bore 306.

In the example system of FIG. 8, the circular stem member 800 defines the flow passage 600 which is fluidly coupled to the piston bore 426, and intersects the outer face 810. Though FIG. 8 shows the valve 100 in the closed orientation, when open the controlled fluid flows into the piston bore 426 and out through the flow passage 600 to the outlet port 202, and thus the controlled fluid exits the flow passage 600 coaxial with the central axis 422 of the valve housing 402.

In the example valve discussed to this point, the piston 404 is a "balanced" piston. To explain the balanced aspect, consider the closed orientation shown in FIG. 8. In particular, the pressures acting on the surfaces beyond the seals 452 and 454 (i.e., on the surfaces of the proximal end 442 and the distal end 444) are the same, and in this case being the fluid pressure at the inlet port 110 (not visible in FIG. 8). Thus, a force used to translate the piston 404 is only the force needed to overcome the force of friction of the piston 404 in the piston bore 426. Now consider the valve housing 402. When the valve 100 is open, the pressure of the controlled fluid is exposed to the out face 810 of the circular stem member 800, while atmospheric pressure is exposed to the outer face 428 of the circular stem member 114. The difference in pressure as between the controlled fluid and atmospheric pressure thus creates a force tending to bias the valve housing 402 toward the circular stem member exposed to the lowest pressure. Here, the force would tend to bias the valve housing toward the cap member 106, which force increases the force of friction and thus increases the amount of force needed to turn the valve housing 402. Depending on the pressure of the controlled fluid, and the torque that an automatic valve operator can apply to the valve housing 402 to effectuate turning and thus opening and closing the valve 100, the additional friction and thus additional torque may not be an issue. However, in some situations it may be beneficial to create a "balanced" valve housing 402 which would thus reduce the friction created and corresponding reduce the torque used to turn the valve housing 402.

Figure 9:
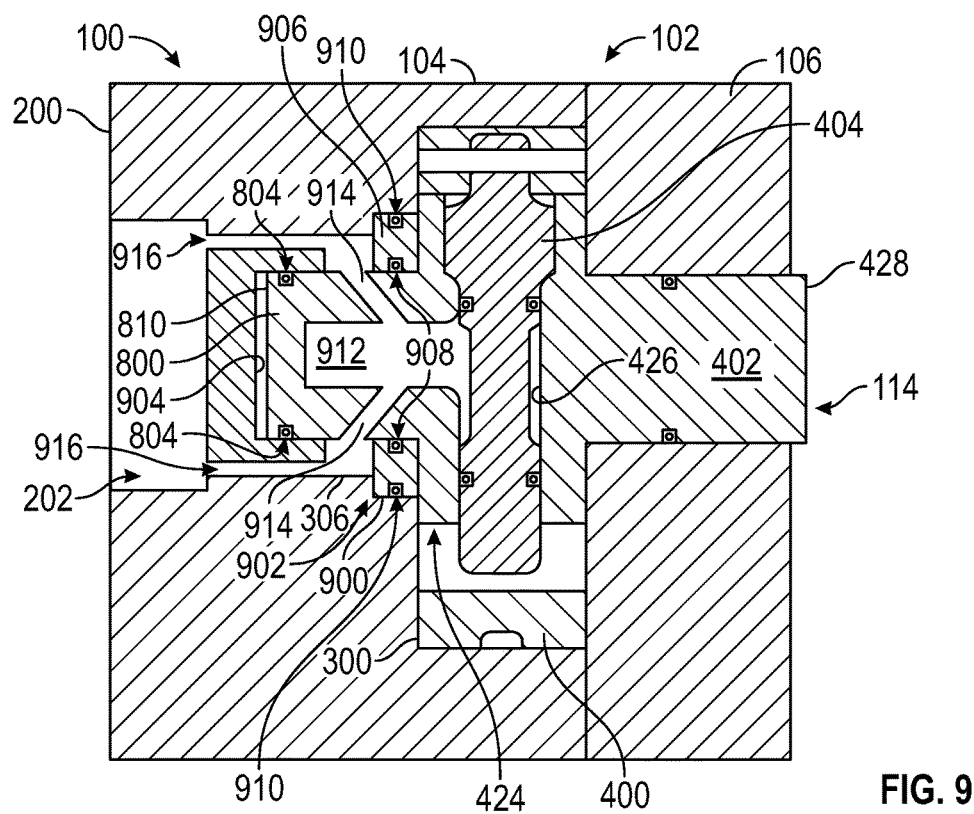
FIG. 9 shows a cross-sectional view of a valve in a closed orientation in accordance with at least some embodiments.

FIG. 9 shows a cross-sectional view of a variation of the internal valve members which creates a balanced valve housing 402. In particular, FIG. 9 shows the valve body 102 (comprising both the main body member 104 and the cap member 106). The outer face 428 of the circular stem member 114 is exposed through the cap member 106. Moreover, the outlet port 202 is likewise shown on the back face 200 of the valve body 102. Within the valve the valve housing 402 is shown, along with the eccentric ring 400 and the piston 404. Also visible in FIG. 9 is the circular stem member 800, and the various relationships of the circular stem member 800 discussed with respect to FIG. 8 apply equally to FIG. 9.

The example embodiments of FIG. 9 include a third counter bore 902 defining an inside diameter smaller than the first counter bore 300, yet slightly larger (e.g., a centimeter or less) than the inside diameter of the second counter bore 306 such that a shoulder region 900 is defined. In the case of FIG. 9, the second counter bore 306 may be considered a "blind bore", as the second counter bore does not extend through the main body member 104; rather, the second counter bore 306 defines an internal face 904.

The example embodiments of FIG. 9 include an additional component in the form of seal ring 906. Seal ring 906 defines an outside diameter slightly smaller than the inside diameter of the third counter bore 902, and seal ring 906 defines an inside diameter slightly larger than the outside diameter of the circular stem member 800. The seal ring 906 telescopes within the third counter bore 902 and abuts the shoulder region 900. Likewise, the circular stem member 800 telescopes through the inside diameter of the seal ring 906. Seal ring 906 defines an internal seal 908 which seals against the circular stem member 800, and the seal ring 906 defines an external seal 910 which seals against the third counter bore 902. As with the other example seals, the internal and external seals 908 and 910 take the form of an annular groove on the seal ring in combination with an O-ring. The annular grooves and O-rings are not specifically numbered in FIG. 9 so as not to further complicate the figure. Moreover, other sealing mechanisms may be equivalently used. The seal ring 906 may be constructed of any suitable material, such as a metallic material or high density plastic material. Moreover, while the example systems of FIG. 9 include the seal ring 906, in other example systems the seal ring may be omitted, and instead the geometry formed by the main body member 104. In such a case, the internal seal 908 may be formed in the geometry of the main body member 104.

Still referring to FIG. 9, the circular stem member 800 of these embodiments likewise has a seal 804 and outer face 810. However, the flow passage 912 of the embodiments of FIG. 9 is exposed on an outside diameter of the circular stem member 800 between the seal 804 and the piston receptacle member 424 of the valve housing 402 (rather than being exposed on the outer face 810 along the central axis 802 as shown in FIG. 8). In particular, the flow passage 912 comprises at least one (and as shown two) radial bores 914 that extend from the internal portion of the flow passage 912 to the outside diameter of the circular stem member 800. While FIG. 9 shows two such radial bores 914 in cross-section, one or more of such radial bores 914 may be used (e.g., two, three, four, six) depending on the size of the valve and the designed open orientation flow of the valve 100.

Though FIG. 9 shows the valve 100 in the closed orientation, when in the open orientation the controlled fluid flows into the flow passage 912 from the piston bore 426, radially outward through the radial bore(s) 914, then through one or more external flow passages 916 (which external flow passages extend to and thus fluidly couple the second counter bore 306 to the outlet port 202).

Unlike the valve 100 of FIG. 8, the valve 100 of FIG. 9 has a more "balanced" valve housing 402 when the valve is in the open orientation. In particular, because the controlled fluid exits the valve housing 402 on an outside diameter of the circular stem member 800, and because the controlled fluid is sealed from the outer face 810 of the circular stem member 800, when the valve is in the open orientation the pressure of the controlled fluid does not tend to create a force biasing the valve housing toward the cap member 106. In fact, if the pressure within the volume between the outer face 810 of the circular stem member 800 and the internal face 904 of the second counter bore 306 is atmospheric pressure, then the valve housing 402 should be very close to fully balanced, thus reducing the biasing force, the friction created by the biasing force, and reducing the torque used to turn the valve housing 402. Though not specifically shown in the cross-sectional view of FIG. 9, an aperture through the main body member 104 to the volume between the outer face 810 and the internal face 904 can be used to ensure atmospheric pressure applied to the outer face 810.

While FIG. 9 shows the internal seal 908 created by an annular groove on the seal ring 906, in other cases the internal seal 906 could be created by an annular groove on the outside diameter of the circular stem member 800 with an O-ring therein sealing against an internal diameter of the seal ring 906.

Figure 10:
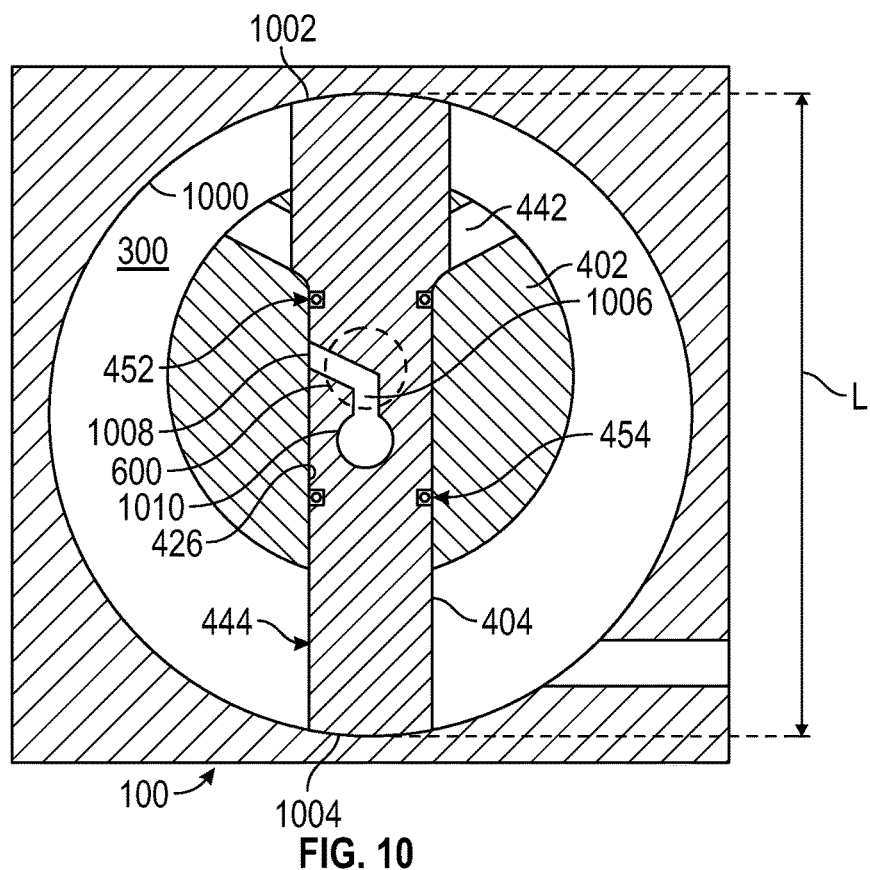
FIG. 10 shows a cross-sectional view of a valve in a closed orientation in accordance with at least some embodiments.
Figure 11:
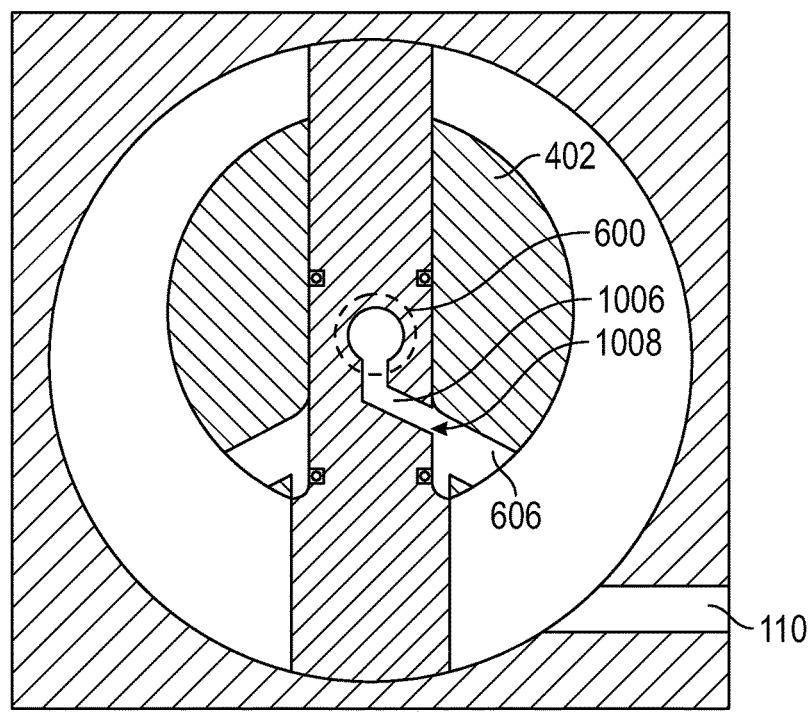
FIG. 11 shows a cross-sectional view of a valve in an open orientation in accordance with at least some embodiments.

FIG. 10 is a cross-sectional view of a valve 100 in a closed orientation in accordance with yet still further alternative systems. Likewise, FIG. 11 is a cross-sectional view of a valve 100 in an open orientation in accordance with the further alternative systems. In particular, FIGS. 10 and 11 simultaneously show two alternatives—a valve without an eccentric ring and a valve with a piston with an internal flow passage. It is noted that FIGS. 10 and 11 present these alternatives together, but such is not required. Systems without an eccentric ring may be implemented regardless of the type of piston used, and vice versa.

In the example alternate system, the eccentric ring is omitted and the piston 404 has an extended length. In particular, the proximal end 442 of the piston 404 is extended such that, during at least a portion of the rotation of the valve housing 402 the proximal end of the piston 404 abuts an inside diameter 1000 of the first counter bore 300 (e.g., when the valve is closed). To this end, the piston 404 of FIG. 10 defines a bearing face 1002 on the proximal end 442 of the piston 404. The bearing face 1002 can take any suitable form. For example, the proximal end 442 of the piston may define a solid circular cylinder in cross-section, and the bearing face 1002 may be milled to have surface that conforms to the circular internal diameter 1000 of the first counter bore 300. Likewise, the distal end 444 of the piston is extended such that, during at least a portion of the rotation of the valve housing 402, the distal end 444 of the piston 404 abuts an inside diameter 1000 of the first counter bore 300 (e.g., when the valve is open). The piston 404 thus defines a bearing face 1004 on the distal end 444 of the piston 404. The bearing face 1004 can take any suitable form. For example, the distal end 444 of the piston may define a solid circular cylinder in cross-section, and the bearing face 1004 may be milled to have surface that conforms to the circular internal diameter 1002 of the first counter bore 300.

It follows that the example piston 404 of FIG. 10 has an axial length L slightly smaller than the internal diameter (D1 in FIG. 3) of the first counter bore 300. As the piston 404 translates from a closed orientation (FIG. 10) to an open orientation (FIG. 11) by rotation of the valve housing 402, the force causing the translation is applied by the bearing face 1002 abutting the inside diameter 1000. Likewise, as the piston 404 translates from an open orientation (FIG. 11) to a closed orientation (FIG. 10), the force causing the translation is applied by the bearing face 1004 abutting the inside diameter 1000. Thus, while in the previous embodiments the eccentric ring serves a bearing function and may reduce wear on the inside diameter 1000 of the first counter bore 300, in the example system of FIGS. 10 and 11 the proximal end 442 and distal end 444 directly serve the bearing function.

Still referring to FIGS. 10 and 11, the example system further comprise an alternate structure for channeling flow with respect the piston 404. In particular, the piston 404 of these example systems has an internal flow passage 1006. The flow passage 1006 has an entrance portion 1008 defined on the outside diameter of the piston 404 on the proximal end 442, and more particularly the entrance portion resides between the seals 452 and 454, but closer to the seal 452. The flow passage 1006 further defines an exit portion 1010 medially disposed between the seals 452 and 454. In the closed orientation shown in FIG. 10, the entrance portion 1008 is sealed against flow of the controlled fluid by the seals 452 and 454 sealing against the piston bore 426. Shown in dashed lines is the flow passage 600 associated with the circular stem member 800 (not shown). When the valve housing 402 is turned relative to the valve body 102, the piston 404 is translated (as discussed above) resulting an open orientation as shown in FIG. 11. In the open orientation the entrance portion 1008 aligns with the aperture 606 in the valve housing 402 such that the flow passage 1006 is both fluidly coupled to the inlet port 110 and the flow passage 600 associated with the circular stem member 800.

A few points before proceeding. While FIGS. 10 and 11 show a single entrance portion 1008, the flow passage 1006 may be associated with the one or more entrance portions that fluidly couple to the flow passage 1006 (e.g., one entrance portion on each side associated one each with the apertures 438 and 606 in the valve housing 402). Further, in order to create the flow passage 1006, additional bores may be created and later plugged (e.g., a bore extending along the long axis of the piston 404 from the bearing face 1002, bearing face 1004, or both, later plugged to prevent unintended fluid flow). Finally, the piston 404 of FIGS. 10 and 11 is likewise "balanced" in the closed orientation for the same reasons as the piston discussed above having the annular trough rather than an internal flow passage.

Figure 12:
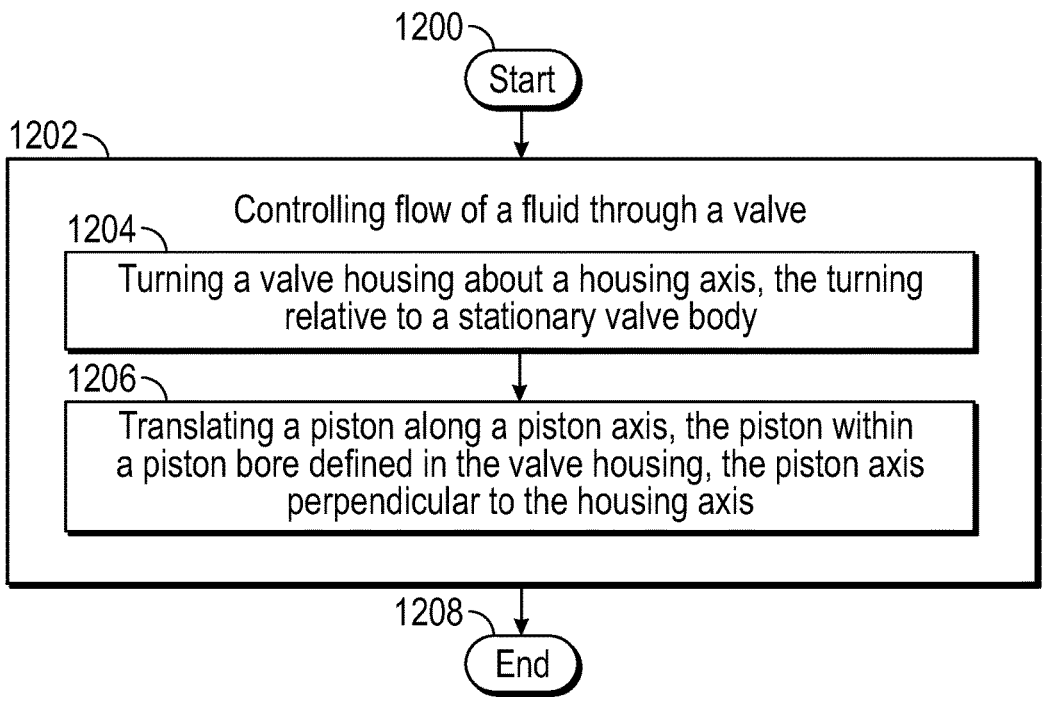
FIG. 12 shows a method in accordance with at least some embodiments.

FIG. 12 shows a method in accordance with at least some embodiments. In particular, the method starts (block 1200) and proceeds to controlling flow of a fluid through a valve (block 1202). Controlling the flow through the valve may comprise: turning a valve housing about a housing axis, the turning relative to a stationary valve body (block 1204); and thereby translating a piston along a piston axis, the piston within a piston bore defined in the valve housing, the piston axis perpendicular to the housing axis (block 1206). Thereafter the method ends (block 1208). The controlling may comprising opening the valve, where translating the piston involves unblocking a flow passage through the valve.

Likewise, the controlling may comprise closing the valve by turning the valve housing in the same rotational direction as used to open the valve.

Figure 13:
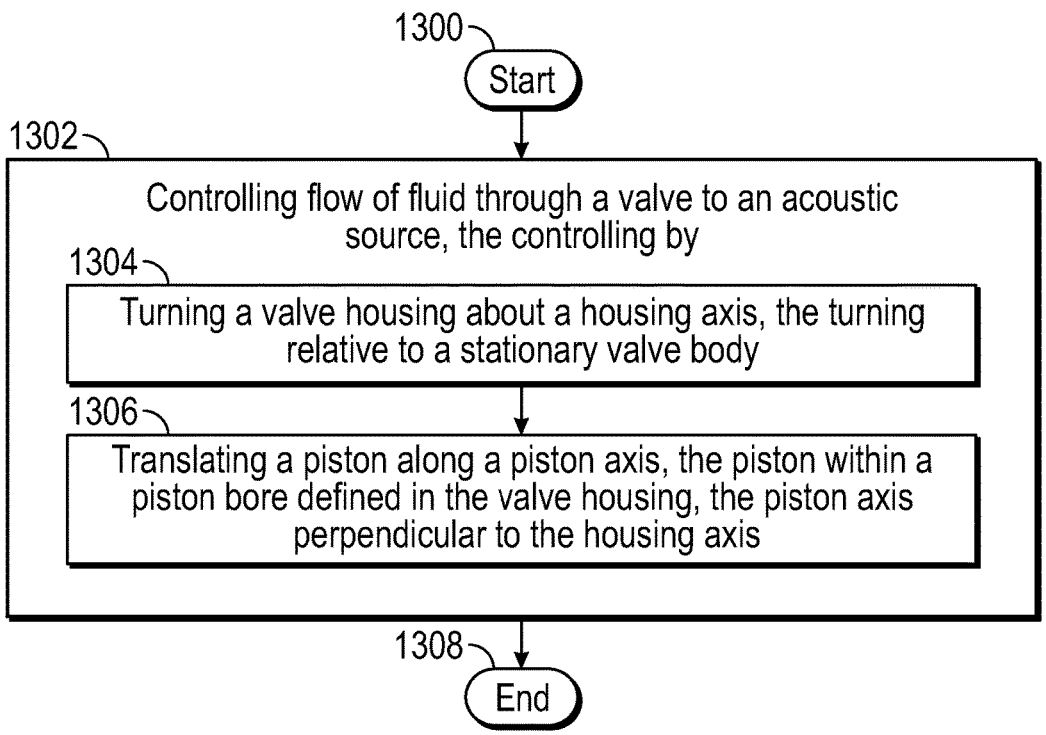
FIG. 13 shows a method in accordance with at least some embodiments.

The example valve described in the specification has many potential uses. In the context of marine geophysical surveying the valve may be used to control the flow of fluid to a seismic or acoustic source, such as an air gun, a water gun, a steam gun, a marine vibrator, or any device energized by flow of fluids. Thus, the fluid controlled by the valve in any particular circumstance may be air, fresh water, sea water, steam, or hydrocarbon-based hydraulic fluids. FIG. 13 shows a method in accordance with the marine geophysical surveying embodiments. In particular, the method starts (block 1300) and proceeds to controlling flow of fluid through a valve to an acoustic source (block 1302). Controlling flow of fluid to the acoustic source may involve activating the acoustic source by opening the valve. Likewise, controlling the flow of fluid may deactivating the acoustic source by closing the valve. Controlling flow of fluid may involve: turning a valve housing about a housing axis, the turning relative to a stationary valve body (block 1304); and translating a piston along a piston axis, the piston within a piston bore defined in the valve housing, the piston axis perpendicular to the housing axis (block 1306). Thereafter the method ends (block 1308), in most cases to be restarted on the next activation of the acoustic source.

It is noted that the various embodiments discussed to this point have assumed that flow through the example valves moves from the inlet port 110 to the outlet port 202; however, the valves described above may work equally well with the controlled fluid flowing from the what is termed the "outlet port" 202 to the what is termed the "inlet port" 110. Thus, the component reference names in the specification shall not be read to require flow through the example valves is limited by the component reference names.

References to "one embodiment", "an embodiment", "a particular embodiment", "some embodiments", and "example system" indicate that a particular element or characteristic is included in at least one embodiment of the invention. Although the phrases "in one embodiment", "an embodiment", "a particular embodiment", and "some embodiments" may appear in various places, these do not necessarily refer to the same embodiment.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A valve assembly comprising:
   a valve body that comprises
      a first counter bore with a first diameter and a first central axis;
      a second counter bore disposed within the first counter bore, the second counter bore having a second central axis parallel to and offset from the first central axis, and a second diameter smaller than the first diameter;
      an inlet port fluidly coupled to the first counter bore; and
      an outlet port fluidly coupled to the second counter bore;
   a valve housing comprising
      a circular stem member that defines a third central axis;
      a piston receptacle member that defines a piston bore, the piston bore defines a fourth central axis perpendicular to the third central axis;
      a flow passage defined in the circular stem member, the flow passage fluidly coupled to the piston bore;
      the circular stem member disposed within the second counter bore;
      the piston receptacle member disposed within the first counter bore; and
      the second and third central axis are coaxial;
   a piston that defines a proximal end and a distal end, the piston disposed in the piston bore of the valve housing;
   an eccentric ring that defines a fifth central axis, the eccentric ring disposed within the first counter bore, the eccentric ring circumscribes the valve housing, the proximal end of the piston coupled to the eccentric ring, and the first and fifth central axis are coaxial;
   the valve assembly defines a closed orientation by a first rotational orientation of the piston and piston bore relative to the second counter bore, and the valve assembly defines an open orientation by a second rotational orientation of the piston and piston bore relative to the second counter bore, the second rotational orientation distinct from the first rotational orientation.

2. The valve assembly of claim 1 wherein the eccentric ring further comprises:
   an aperture through the eccentric ring proximate to the proximal end of the piston; and
   wherein in the open orientation the aperture through the eccentric ring at least partially aligns with the inlet port.

3. The valve assembly of claim 2 wherein the eccentric ring further comprises an annular groove defined on an outside diameter of the eccentric ring, the aperture through the eccentric ring intersects the annular groove.

4. The valve assembly of claim 1 wherein the valve housing further comprises:
   an outer face defined by the circular stem member; and
   the flow passage in the first circular stem member intersects the outer face.

5. The valve assembly of claim 1 wherein the valve housing further comprises:
   an outer face defined by the circular stem member;
   a first seal exposed on an outside diameter of the circular stem member between the outer face and the piston receptacle member; and
   an exit portion of the flow passage in the circular stem member disposed between the first seal and the piston receptacle member.

6. The valve assembly of claim 1 wherein the first rotational orientation is 180 degrees of rotation different than the second rotational orientation.

7. A valve assembly comprising:
   a valve body that comprises
      a first counter bore with a first diameter and a first central axis;
      a second counter bore disposed within the first counter bore, the second counter bore having a second central axis parallel to and offset from the first central axis, and a second diameter smaller than the first diameter;
      an inlet port fluidly coupled to the first counter bore; and
      an outlet port fluidly coupled to the second counter bore;
   a valve housing comprising
      a circular stem member that defines a third central axis;

a piston receptacle member that defines a piston bore, the piston bore defines a fourth central axis perpendicular to the third central axis;

a flow passage defined in the circular stem member, the flow passage fluidly coupled to the piston bore;

the circular stem member disposed within the second counter bore;

the piston receptacle member disposed within the first counter bore; and the second and third central axis are coaxial;

a piston that defines a proximal end and a distal end, the piston disposed in the piston bore of the valve housing;

the valve assembly defines a closed orientation by a first rotational orientation of the piston and piston bore relative to the second counter bore, and the valve assembly defines an open orientation by a second rotational orientation of the piston and piston bore relative to the second counter bore, the second rotational orientation distinct from the first rotational orientation;

the proximal end of the piston abuts an inside diameter of the first counter bore in the closed orientation, and the distal end of the piston abuts the inside diameter of the first counter bore in the closed orientation.

8. The valve assembly of claim 7 wherein the piston further comprises:

an annular trough medially disposed on the piston;

a first seal disposed on a first side of the annular trough;

a second seal disposed on a second side of the annular trough opposite the first side; and in the closed orientation both the first and second seals abut an inside diameter of the piston bore on opposite sides of the flow passage.

9. The valve assembly of claim 8 wherein in the open orientation the first seal does not abut the inside diameter of the piston bore.

10. The valve assembly of claim 7 wherein the piston further comprises:

a passage within the piston, the passage within the piston defines an entrance portion proximate to the proximal end of the piston, and an exit portion; and wherein in the closed orientation the entrance portion is blocked to flow, and in the open orientation the entrance portion is fluidly coupled to the inlet port and the exit portion is fluidly coupled to the flow passage of the circular stem member.

11. A method comprising:

controlling flow of a fluid through a valve by turning a valve housing about a housing axis, the turning relative to a stationary valve body; and thereby translating a piston along a piston axis, the piston within a piston bore defined in the valve housing, the piston axis perpendicular to the housing axis; and turning an eccentric ring about a ring axis, the eccentric ring encircles the valve housing, and the ring axis parallel to and offset from the housing axis, the piston coupled to the eccentric ring.

12. The method of claim 11 wherein controlling the flow further comprises opening the valve, and wherein translating the piston further comprises unblocking a flow passage through the valve housing, the unblocking by the translation of the piston in the piston bore.

13. The method of claim 11 wherein turning the eccentric ring further comprises providing a force to the eccentric ring by way of the piston.

14. The method of claim 11 further comprising flowing the fluid through an aperture through the eccentric ring.

15. The method of claim 11 further comprising flowing the fluid through an annular channel defined on an exterior surface of the eccentric ring.

16. The method of claim 11 further comprising flowing the fluid through the flow passage coaxial with the housing axis.

17. The method of claim 11 further comprising flowing the fluid through the flow passage, where the fluid exits the flow passage on an outside diameter of the valve housing.

18. The method of claim 11 further comprising flowing the fluid through the flow passage, where the fluid exists the flow passage coaxial with the housing axis.

19. The method of claim 11 further comprising closing the valve by turning the valve housing in the same rotational direction as used when opening the valve.

20. A method of geophysical surveying comprising:

controlling flow of fluid through a valve to an acoustic source, the controlling by opening the valve by turning the valve housing about a housing axis, the turning relative to a stationary valve body; and thereby turning an eccentric ring about a ring axis, the eccentric ring encircles the valve housing, and the ring axis parallel to and offset from the housing axis, the piston coupled to the eccentric ring; and translating a piston along a piston axis and thereby unblocking a flow passage through the valve housing, the piston within a piston bore defined in the valve housing, the piston axis perpendicular to the housing axis.

21. The method of claim 20 wherein controlling flow of fluid further comprises activating the acoustic source by opening the valve, and wherein translating the piston further comprises unblocking a flow passage through the valve housing, the unblocking by the translation of the piston in the piston bore.

22. The method of claim 20 further comprising flowing the fluid through an aperture through the eccentric ring.

23. The method of claim 20 further comprising flowing the fluid through an annular channel defined on an exterior surface of the eccentric ring.

24. The method of claim 20 further comprising flowing the fluid through the flow passage coaxial with the housing axis.

25. The method of claim 20 further comprising flowing the fluid through the flow passage, where the fluid exits the flow passage on an outside diameter of the valve housing.

26. The method of claim 20 further comprising deactivating the acoustic source by closing the valve by turning the valve housing in the same rotational direction as used when opening the valve.

* * * * *